United States Patent [19]

Laird et al.

[11] 4,111,348

[45] Sep. 5, 1978

[54] GRID BRAZE APPLICATION MOLD

[75] Inventors: Willy S. Laird, West Columbia; Ben O. Kendall, Orangeburg, both of S.C.

[73] Assignee: Westinghouse Electric Corp., Pittsburgh, Pa.

[21] Appl. No.: 775,807

[22] Filed: Mar. 9, 1977

[51] Int. Cl.² ............... B23K 31/02; B23K 37/04; B23K 3/06

[52] U.S. Cl. ................................ 228/181; 228/33; 228/248

[58] Field of Search ................. 228/33, 181, 245, 248, 228/182

[56] References Cited

U.S. PATENT DOCUMENTS 3,913,210  10/1975  Broad .................................. 228/181
3,948,431  4/1976  Niimi et al. .......................... 228/181

Primary Examiner—Donald G. Kelly
Assistant Examiner—K. J. Ramsey
Attorney, Agent, or Firm—L. A. DePaul; Z. L. Dermer

[57] ABSTRACT

Method and apparatus for forming a braze joint along the intersection of grid straps of a nuclear fuel assembly. A substantially cylindrical mold having a cavity therein for holding a braze material and having notches near its bottom end complementary to the grid straps is placed on the grid such that the centerline of the mold is substantially colinear with the intersection of the grid straps. Upon heating the grid and mold assembly, the braze material that has been placed in the mold cavity flows by gravity along the intersection of the grid straps which upon cooling forms a brazed joint.

10 Claims, 6 Drawing Figures

GRID BRAZE APPLICATION MOLD

BACKGROUND OF THE INVENTION

This invention relates to brazing methods and more particularly to methods for brazing the joints of grids of nuclear fuel assemblies.

In many designs of nuclear reactors, the reactor vessel has an inlet and outlet for circulation of a coolant in heat transfer relationship with a core contained therein that produces heat. The core comprises an array or arrays of fuel assemblies which contain fuel elements. The fuel element is generally a cylindrical metallic sheath sealed at both ends containing nuclear fuel. The nuclear fuel which may be, for example, ceramic fuel pellets of a uranium compound is stacked in the fuel elements. During reactor operation, the fissionable isotopes within the nuclear fuel pellets absorb neutrons and subsequently fission generating heat as is well known in the art. The reactor coolant absorbs the heat while circulating through the core thereby cooling the fuel elements of the core and heating the coolant. Of course, the heated coolant may then be conducted to a location remote from the reactor vessel to produce electricity in a conventional manner.

In addition to fuel elements, typical fuel assemblies comprise top and bottom nozzles located at the ends of the fuel assembly which serve to hold the fuel elements together in an array. The top and bottom nozzles also provide mechanisms by which the fuel assembly may be held upright within the reactor core and may be held during transit to and from the reactor core. The fuel assemblies may further comprise grids spaced at various locations along the length of the fuel elements between the top and bottom nozzles that hold the fuel elements in appropriate relationship to each other. The grids also serve to provide spaces between the fuel elements for accommodating control rods. The grids may comprise thin metal straps having slots therein for accommodating the insertion of complimentary similar straps. When the straps have been inserted into the slots, the set of straps form a rectangular grid of rectangular holes for accomodating fuel elements or control rods. This type of grid has a configuration that resembles an "egg crate" structure. With the fuel elements disposed in the rectangular holes the grids thereby serve to properly space and align the fuel elements. Furthermore, flow vanes may be disposed on the grids for enhancing heat transfer. Typical grid structures are described and shown in U.S. Pat. Nos. 3,379,617 and 3,379,619, both issued in the name of H. N. Andrews et al.

Once the straps have been interconnected by means of their respective slots, it then becomes necessary to permanently bond the straps to each other. One such method known in the art for bonding the straps together is to apply braze metal by means of an applicator air gun along the intersection of the straps. When the braze metal has been so applied, the grid may be placed in a furnace so that the braze metal may braze the straps together along the line defined by their intersection. While the use of an air gun applicator to apply the braze metal has been generally effective, there has been an established need to be able to apply an exact predeterminable amount of braze metal to the joint.

SUMMARY OF THE INVENTION

Method and apparatus for forming a braze joint along the intersection of grid straps of a nuclear fuel assembly. A plurality of thin metal first straps having a plurality of thin slots extending from one side to near the other side along the width of the first straps are placed over a plurality of thin metal second straps so that the second straps fit into the thin slots of the first strap thereby forming a rectangular grid. At least one substantially cylindrical mold having a cavity therein for holding a braze material and having notches near its bottom end complimentary to the grid straps is placed on the grid such that the centerline of the mold is substantially colinear with the intersection of the grid straps. Upon heating the grid and mold assembly, the braze material that has been placed in the mold cavity flows by gravity along the intersection of the grid straps which upon cooling forms a brazed joint.

It is an object of this invention to provide a mold for applying a predetermined amount of braze material to a joint of a grid in a nuclear fuel assembly.

It is another object of this invention to provide a method for applying a predetermined amount of braze material to a joint of a grid in a nuclear fuel assembly.

It is a more particular object of this invention to provide a method for applying a predetermined amount of braze material to a joint of a grid in a nuclear fuel assembly that includes the step of placing a mold containing the braze material on the grid so that upon heating gravity will cause the braze material to flow along the joint.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings, wherein:

DESCRIPTION OF THE PREFERRED EMBODIMENT

Many fuel assemblies used in nuclear reactors incorporate grid structures that are used to maintain spacing among the fuel elements of the fuel assembly. The grid structures are formed by interconnecting thin metal straps. The invention described herein provides a means to braze the straps together along their intersection.

Figure 1:
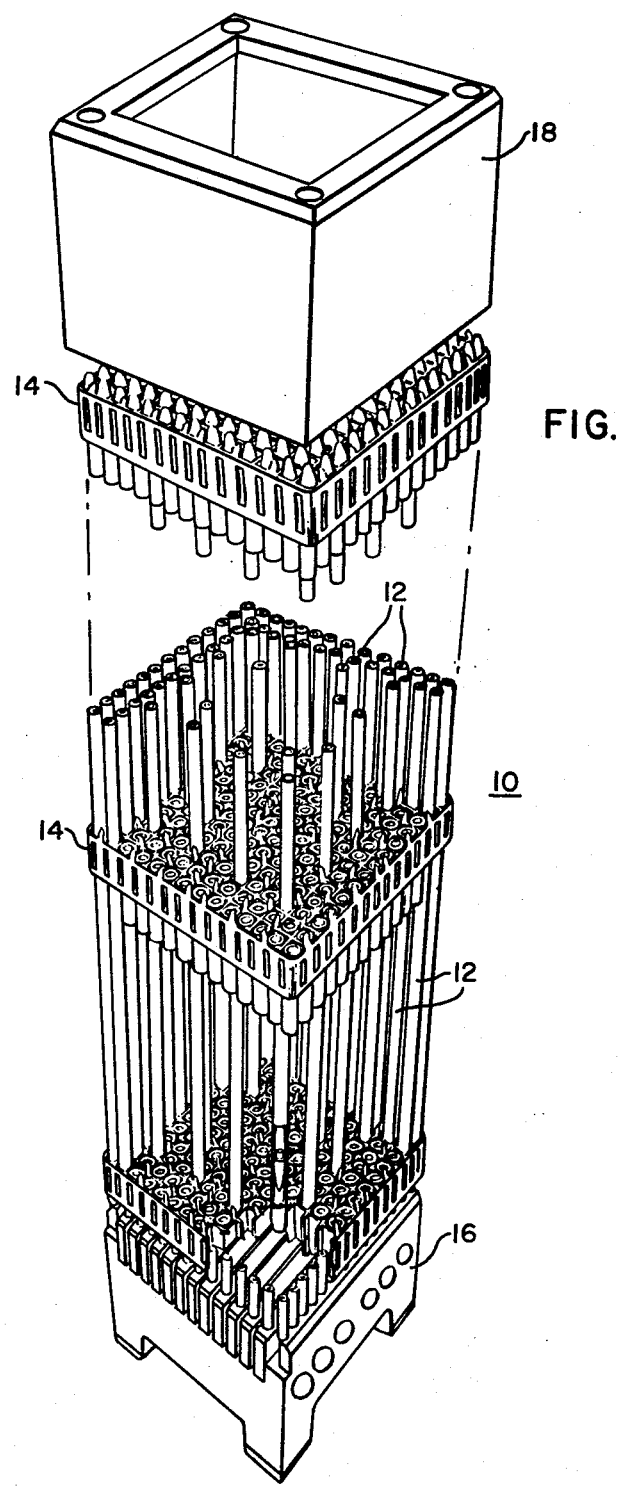
FIG. 1 is a view in perspective of a typical fuel assembly.

Referring to FIG. 1, a fuel assembly referred to generally as 10 comprises fuel elements 12, grids 14, lower nozzle 16, and upper nozzle 18. Fuel elements 12 may be elongated cylindrical metallic tubes containing nuclear fuel pellets and having both ends sealed by end plugs. The lower ends of fuel elements 12 are positioned in lower nozzle 16 while the upper ends are positioned in upper nozzle 18. Grids 14 are positioned at various locations along the lengths of fuel assembly 10 and serve to space fuel elements 12 at appropriate distances

} from each other to thereby prevent two fuel elements 12 from contacting each other and to allow the reactor coolant to circulate in heat transfer relationship with the fuel elements 12. Grids 14 also provide spaces to accommodate control rods or burnable poison rods (not shown).

Figure 2:
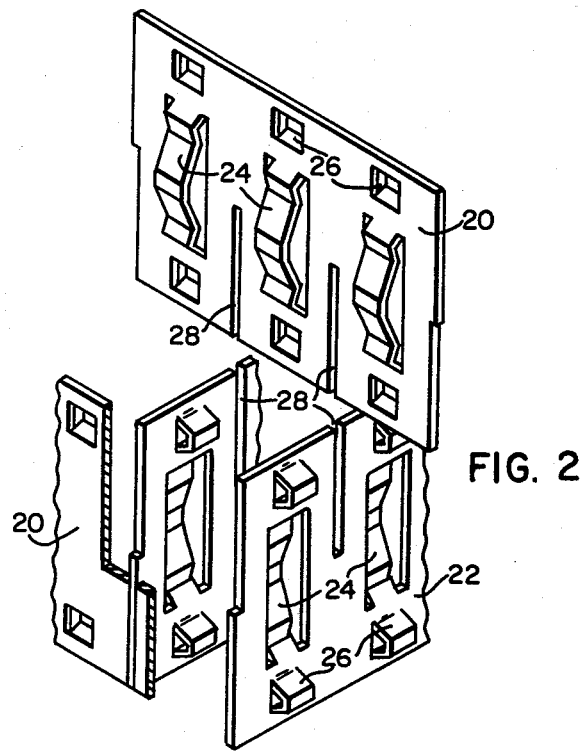
FIG. 2 is an isometric view of a plurality of grid straps with one strap being removed from the grid structure so as to show how the straps may be interconnected into an "egg crate-like" grid structure.
Figure 3:
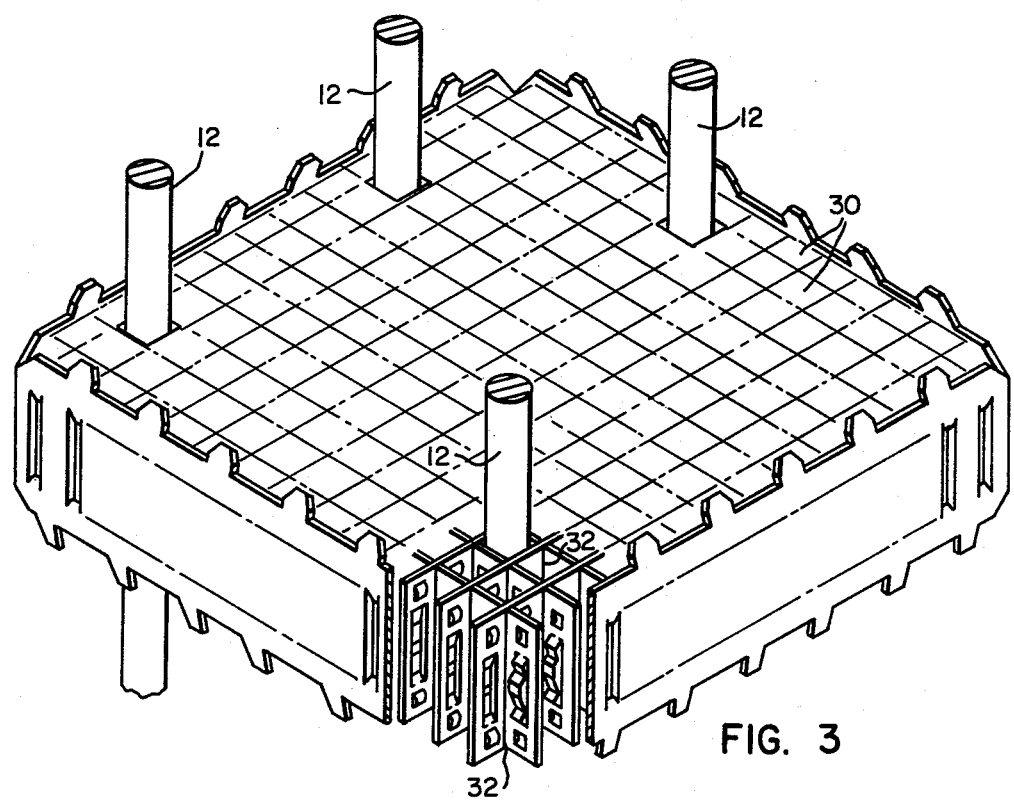
FIG. 3 is a view in perspective of a fuel assembly grid.

Referring now to FIG. 2, grid 14 comprises first straps 20 and second straps 22 which may be manufactured of Inconnel 718. Both first straps 20 and second straps 22 have dimples 24 and projections 26 disposed at various locations thereon that act as springs to laterally hold fuel elements 12. First straps 20 and second straps 22 also have slots 28 therein that extend from one side to approximately midway through the width of the strap. First straps 20 and second straps 22 may be interconnected by sliding first strap 20 over second strap 22 along slots 28 as is indicated in FIG. 2. When several first straps 20 and several second straps 22 are perpendicularly interconnected in this manner, they form a grid 14 as shown in FIG. 3. A more detailed description of this type of grid may be found in U.S. Pat. Nos. 3,379,617 and 3,379,619, both issued in the name of H. N. Andrews et al.

Referring again to FIG. 3, the interconnection of first straps 20 and second straps 22 define rectangular chambers 30 through which fuel elements 12 may extend. The intersection of first straps 20 with second straps 22 define joints 32 which are coextensive with the corners of chambers 30. Because joints 32 are formed merely by slipping one strap over the other along slots 28, it is necessary to strengthen those joints 32 by a brazing or welding process that will permanently join first straps 20 to second straps 22 along joints 32.

Figure 4:
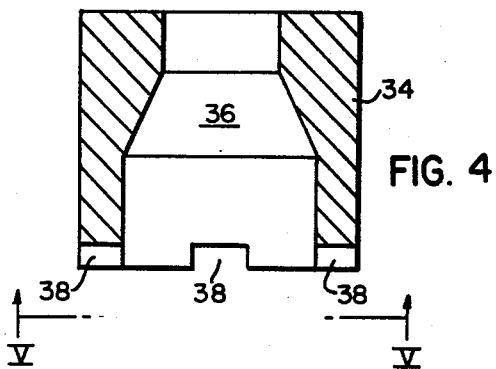
FIG. 4 is a cross-sectional view in elevation of the mold.
Figure 5:
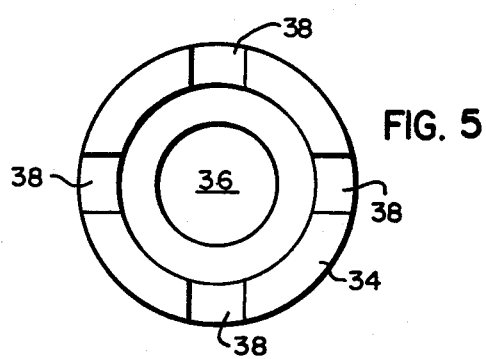
FIG. 5 is a view along line V—V of FIG. 4.
Figure 6:
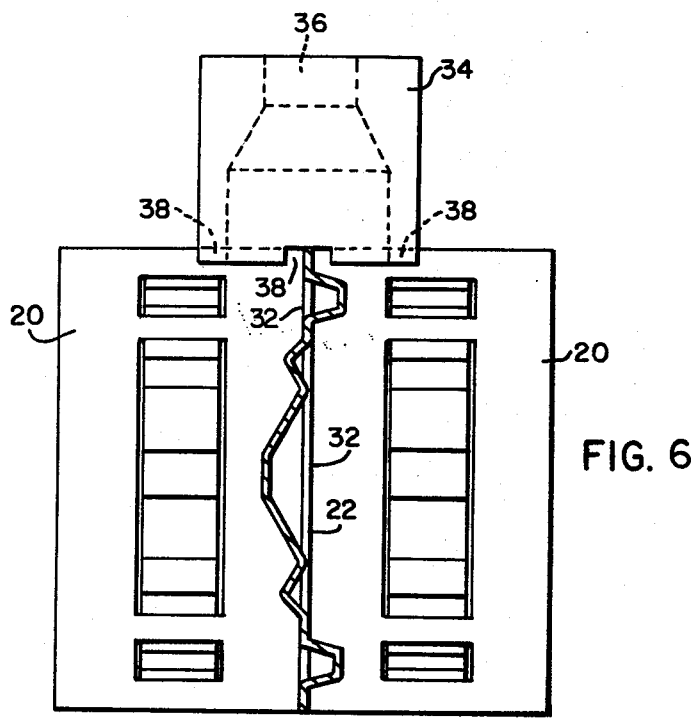
FIG. 6 is a partial view of a grid with a mold mounted thereon.

Referring now to FIGS. 4 and 5, a mold 34 which may be a substantially cylindrical member may be used to apply a predetermined amount of braze material to joints 32. Mold 34 has a cavity 36 therein that extends the length of mold 34 in a tapered fashion. In addition, mold 34 may have notches 38 near its bottom end that conform to the width of first straps 20 and second straps 22 so that mold 34 may be supported by those straps at their intersections as shown in FIG. 6. A predetermined amount of braze material sufficient to braze joints 32, for example approximately 200 milligrams, may be placed in cavity 36 so that when mold 34 is heated, the braze material will be drawn down along joints 32 by gravity which upon cooling will form a brazed joint. To facilitate this process, mold 34 may be manufactured from an aluminum oxide compound or other compound that will not cause braze material to adhere to mold 34 when heated.

Before the braze material is placed into mold 34, mold 34 should be cured according to the following procedure. The uncured mold 34 should be placed on a flat surface fixture and the fixture and mold 34 placed in a cold curing furnace. The furnace should then be raised to 2000° at a rate of 125° F per 15 minutes. It should be noted that the heat rise should not exceed 500° per hour. When the furnace has been raised to 200° F, the mold 34 should be kept therein for approximately 2 hours. The curing temperature of 2000° F is chosen to be above the brazing temperature to avoid crystallization of the mold during the brazing process. After heating for the two hours, the furnace should be turned off and allowed to cool below 200° F before removing mold 34 from the furnace. In addition, this curing and cooling process may be performed in a nitrogen atmosphere at a flow rate of 5 cubic feet per hour. When molds 34 have been properly cured, they are then placed on the grid assemblies. Furthermore, before assembly first straps 20 and second straps 22 may be nickel plated with a plating thickness of approximately 0.00003 inches to approximately 0.00035 inches.

OPERATION

Referring again to FIG. 6, a plurality of molds 34 are mounted on grid 14 such that notches 38 straddle first straps 20 and second straps 22 and so that the centerline of mold 34 is in substantial alignment with joints 32. A braze metal in the form of a paste is then placed into cavity 36 through its opening near the top of mold 34. Because of the thick consistency of the braze metal paste and because the straps may extend up into cavity 36, the braze metal remains in the top portion of cavity 36. The braze metal may be chosen to have the following composition:

| Element | Wt. %, Min. | Wt. %, Max. |
| --- | --- | --- |
| Chromium | 11.0 | 15.0 |
| Silicon | — | 0.10 |
| Iron | — | 0.20 |
| Manganese | — | 0.04 |
| Carbon | — | 0.08 |
| Sulfur | — | 0.015 |
| Phosphorus | — | 11.0 |
| Boron | — | 0.02 |
| Aluminum | — | 0.03 |
| Titanium | — | 0.03 |
| Zirconium | — | 0.03 |
| Cobalt | — | 0.10 |
| Oxygen | — | 0.05 |
| Nitrogen | — | 0.08 |
| Nickel Remainder | | |

Once the braze material has been placed in molds 34, the molds 34 and grids 14 are then placed in a vacuum furnace which is at a pressure of $10^{-3}$ torr or less. This pressure is maintained throughout the brazing process. The temperature of the vacuum furnace should be between about 954° and about 1024° C. The molds 34 and grids 14 should be kept in the vacuum furnace at that temperature for at least one hour but no longer than about 1 hour and 10 minutes. During such heating the braze material melts and flows down joints 34 under the influence of gravity. When cooled, the braze material adheres to the metal members and forms a solid joint. Since the same amount of braze material may be added to each mold, the use of the mold assures that each joint will have the same amount of braze material applied thereto which results in uniformity of the joints. In order to maintain the tensile strength of the grid material, when the heating has been completed as described above, the grids 14 and molds 34 should be cooled in the furnace at a temperature decrease rate of 650° C per hour down to a temperature of 593° C. The assemblies are then cooled from 593° C to room temperature at the natural cooling rate for the furnace. However, it should be noted that the brazed grids should not be exposed to the atmosphere outside the furnace until the assemblies have been cooled to at least about 149° C. When the grids 14 have been sufficiently cooled, they may be removed from the furnace and used in a typical fuel assembly. Therefore, the invention provides a method for applying a predetermined amount of braze material to a joint of a grid in a nuclear fuel assembly that includes placing a mold containing the braze material on the grid so that upon heating gravity will cause the braze material to flow along the joint.

While there is described what is now considered to be the preferred embodiment of the invention, it is, of course, understood that various other modifications and variations will occur to those skilled in the art. The claims, therefore, are intended to include all such modifications and variations which fall within the true spirit and scope of the present invention. For example, instead of filling the mold 34 from the top side while on grid 14, the mold 34 may be placed upside down on a flat surface. When in this position, cavity 36 may be filled from the bottom. In this variation a liquid braze material could be used and the liquid allowed to harden in the mold. Once hardened in the mold, the mold could be easily placed on the grid in the appropriate location. Furthermore, several molds may be attached to a single plate so that several molds may be positioned at once.

We claim:

1. A method of brazing together grid straps of a grid of a nuclear fuel assembly comprising:
   assembling said grid whereby a multiplicity of said straps intersect defining lines of intersection;
   placing a mold having a cavity thereon on said straps near their intersection and in vertical alignment with said line of intersection;
   placing a predetermined amount of braze material in said cavity of said mold;
   placing said mold and said grid in a furnace;
   heating said grid and said mold until said braze material melts and flows downward by gravity along said lines of intersection thereby contacting the adjoining straps and filling spaces between said straps; and
   cooling said grid and said mold thus solidifying said braze material and thereby establishing a permanent brazed joint along said line of intersection and permanently joining said straps.

2. The method according to claim 1 wherein said step of placing said mold and said grid in said furnace includes placing said grid and said mold in a vacuum furnace at a pressure of $10^{-3}$ torr or less.

3. The method according to claim 2 wherein said step of heating includes raising the temperature of said furnace to between about 954° and about 1024° C.

4. The method according to claim 3 wherein said step of heating further includes maintaining said temperature for between about 60 minutes and about 70 minutes.

5. The method according to claim 4 wherein said step of cooling includes cooling said grid and said mold by reducing said temperature of said furnace at a rate of 650° C per hour down to a temperature of 593° C.

6. The method according to claim 5 wherein said step of cooling includes cooling said grid and said mold from 593° C to room temperature at the natural cooling rate for said furnace.

7. The method according to claim 6 wherein said step of cooling further includes maintaining said grid and said mold in said furnace until said grid and said mold have been cooled to at least about 149° C.

8. The method according to claim 7 wherein said steps of heating and cooling are performed in a nitrogen atmosphere.

9. The method according to claim 8 including the step of nickel plating said straps before assembly into said grid.

10. The method according to claim 9 wherein said step of nickel plating includes plating said straps with a layer of nickel having a thickness of between about 0.00003 inches to about 0.00035 inches.

* * * * *